United States Patent
Wang et al.

(10) Patent No.: US 11,611,567 B2
(45) Date of Patent: Mar. 21, 2023

(54) METHOD AND SYSTEM FOR MANAGEMENT AND RESOLUTION OF BLOCKCHAIN-BASED TOP-LEVEL DOMAIN

(71) Applicant: Beijing University of Posts and Telecommunications, Beijing (CN)

(72) Inventors: Dongbin Wang, Beijing (CN); Hui Zhi, Beijing (CN); Zhouyi Zhu, Beijing (CN); Xu Zhang, Beijing (CN); Jinqiao Shi, Beijing (CN); Yueming Lu, Beijing (CN); Zemin Zhou, Beijing (CN); Hui Wu, Beijing (CN); Kun Guo, Beijing (CN); Yaoyao Guo, Beijing (CN)

(73) Assignee: Beijing University of Posts and Telecommunications, Beijing (CN)

( * ) Notice: Subject to any disclaimer, the term of this patent is extended or adjusted under 35 U.S.C. 154(b) by 103 days.

(21) Appl. No.: 17/247,253

(22) Filed: Dec. 4, 2020

(65) Prior Publication Data

US 2021/0377281 A1    Dec. 2, 2021

(30) Foreign Application Priority Data

May 28, 2020  (CN) .......................... 202010469676.0

(51) Int. Cl.
*H04L 9/40*  (2022.01)
*H04L 9/32*  (2006.01)
(Continued)

(52) U.S. Cl.
CPC .......... *H04L 63/123* (2013.01); *H04L 9/3247* (2013.01); *H04L 61/4511* (2022.05); *H04L 9/50* (2022.05)

(58) Field of Classification Search
CPC . H04L 63/123; H04L 61/4511; H04L 9/3247; H04L 9/50
See application file for complete search history.

(56) References Cited

U.S. PATENT DOCUMENTS

| | | | | |
|---|---|---|---|---|
| 10,681,147 | B2 * | 6/2020 | Eyer | ................... H04L 61/4511 |
| 2016/0294793 | A1 * | 10/2016 | Larson | ................ H04L 63/0853 |

(Continued)

FOREIGN PATENT DOCUMENTS

| | | |
|---|---|---|
| CN | 108366137 A | 8/2018 |
| CN | 108833603 A | 11/2018 |

(Continued)

OTHER PUBLICATIONS

"Research and Implementation of Decentralized DNS Root Domain Management," Beijing University of Posts and Telecommunications, Jun. 20, 2020, pp. 72 (English Abstract).

(Continued)

*Primary Examiner* — Ghodrat Jamshidi
(74) *Attorney, Agent, or Firm* — TraskBritt

(57) ABSTRACT

Embodiments disclosed herein provide a method and system for management and resolution of a blockchain-based top-level domain. The method comprises: a master node receiving request information for operations on top-level domain resource record from a requesting node, and encapsulating master node information and authenticated request information into a pre-preparation message; each normal node verifying the pre-preparation message, and after successful verification, generating a preparation message comprising request information, a request information verification identifier, and current node information; each node verifying the preparation message, when the number of authenticated preparation message sending nodes reaches a consensus threshold, adding an operation result corresponding to the request information to a new block in a local blockchain. The method ensures security of operations on top-level domain resource record stored in the block, resists top-level domain hijacking attacks, and provides consistent process- (Continued)

ing and storing of operations on top-level domain resource record by multiple nodes.

10 Claims, 2 Drawing Sheets

(51) Int. Cl.
*H04L 61/4511* (2022.01)
*H04L 9/00* (2022.01)

(56) References Cited

U.S. PATENT DOCUMENTS

| | | | | |
|---|---|---|---|---|
| 2017/0134937 | A1* | 5/2017 | Miller | G06Q 20/3829 |
| 2017/0374024 | A1* | 12/2017 | Kasimov | H04L 61/3025 |
| 2018/0287997 | A1* | 10/2018 | Li | H04L 61/4511 |
| 2019/0066066 | A1 | 2/2019 | Lindsey | |
| 2019/0166085 | A1* | 5/2019 | Li | H04L 9/0618 |
| 2019/0333054 | A1* | 10/2019 | Cona | G06Q 20/383 |
| 2020/0059369 | A1* | 2/2020 | Li | H04L 9/3247 |
| 2020/0328883 | A1* | 10/2020 | Kaizer | H04L 9/50 |

FOREIGN PATENT DOCUMENTS

| | | |
|---|---|---|
| CN | 109194493 A | 1/2019 |
| CN | 109347804 A | 2/2019 |
| CN | 109766673 A | 5/2019 |
| CN | 109819003 A | 5/2019 |
| CN | 109889382 A | 6/2019 |
| CN | 109964242 A | 7/2019 |
| CN | 110493198 A | 11/2019 |
| CN | 110543606 A | 12/2019 |
| WO | 2020/005753 A1 | 1/2020 |

OTHER PUBLICATIONS

"Research and Implementation of Root Domain Name System Based on Consortium Blockchain," Beijing Jiaotong University, Jun. 2019, 114 pages (English Abstract).
Chinese Search Report for Chinese Application No. 202010469676.0, dated Mar. 1, 2021, 3 pages.
International Search Report for International Application No. PCT/CN2020/107876, dated Feb. 24, 2021, 4 pages.

* cited by examiner

METHOD AND SYSTEM FOR MANAGEMENT AND RESOLUTION OF BLOCKCHAIN-BASED TOP-LEVEL DOMAIN

CROSS-REFERENCE TO RELATED APPLICATIONS

The present application claims priority to Chinese Application No. 2020104696760 filed on May 28, 2020, entitled "Method and System for Management and Resolution of a Blockchain-Based Top-Level Domain," the entire disclosure of which is hereby incorporated herein by reference.

TECHNICAL FIELD

The present disclosure relates to the technical field of computer networks, and more particularly, to a method and a system for management and resolution of a blockchain-based top-level domain.

BACKGROUND

A domain name system (DNS) is a distributed database with a hierarchical structure. The DNS maps domain names and IP addresses to each other, making it easier for users to access the Internet without having to remember the IP addresses that can be directly read by machines.

When a user accesses the Internet service through a domain name, a client will encapsulate the domain name to be resolved into a domain name resolution request message and send it to a designated domain name resolution recursive server. The recursive server will query the local cache to find an IP address corresponding to the domain name, and then return the IP address to the client via a domain name resolution response message. When the corresponding IP address of the domain name is absent in the local cache, it will firstly query the root server for the authoritative server of the top-level domain (TLD), and then recursively query the authoritative server until the IP address corresponding to the domain name is resolved.

In the early DNS designs, all the root server data should be contained in a 512-byte user datagram protocol (UDP) packet. Limited by the length of UDP bytes, the number of root servers may be limited to thirteen, and thus, currently there are only thirteen root servers. In the existing TLD management and resolution implementation schemes, the root zone file that stores TLD resource information is modified and then distributed to all the thirteen root servers; and later each root server provides the resolution service of the TLD according to the root zone file.

The existing centralized management and resolution of TLDs has a variety of security threats. On the one hand, there is a security risk of domain name hijacking attacks on TLDs. Once a TLD is deleted or modified from the root zone data the user will not be able to obtain a correct resolution of the TLD through the recursive server, which means that the network corresponding to the set of domains under the TLD will no longer be accessible, or the user will be directed to a wrong network address, leaving the corresponding network at risk of disappearance. On the other hand, malicious modifications of TLD resource records implemented by root server administrators will also lead to the risk of disappearance of the corresponding network.

BRIEF SUMMARY

In order to solve at least the problems above, the embodiments of the present disclosure provide a method and a system for management and resolution of a blockchain-based top-level domain.

According to a first aspect, one of the embodiments of the present disclosure provides a method for management and resolution of a blockchain-based top-level domain, comprising: receiving, by a master node, request information for operations on top-level domain resource record sent by a requesting node, and encapsulating master node information and authenticated request information into a pre-preparation message for broadcasting; verifying, by one or more normal nodes, the received pre-preparation message, and after successful verification, generating a preparation message for broadcast, the preparation message comprising request information, a request information verification identifier, and current node information; and verifying, by each node receiving the preparation message, the received preparation message. When the number of authenticated preparation message sending nodes reaches a consensus threshold the method includes adding an operation result corresponding to the request information in the preparation message to a new block in a local blockchain.

In one embodiment, when the number of authenticated preparation message sending nodes reaches the consensus threshold, the method further comprises: adding received information of the preparation message sending nodes and digital signatures thereof to the new block in the local blockchain.

In one embodiment, the request information comprises an operation request and a digital signature of the requesting node, correspondingly. After the master node receives the request information for operations on top-level domain resource record sent by the requesting node, the method further comprises verifying the request information, including: verifying the digital signature of the requesting node. When the digital signature of the requesting node is incorrect, the verification fails; when the digital signature of the requesting node is correct, the method includes making the following judgments: when the operation request is for an operation of newly adding a top-level domain resource record, determining whether the newly added top-level domain is the same as a stored top-level domain; when the newly added top-level domain is the same as the stored top-level domain, the verification fails, otherwise, the verification is passed; when the operation request is for an operation of modifying or deleting a top-level domain resource record, the method includes determining whether the requesting node has the resource record of the top-level domain; when the requesting node has the resource record of the top-level domain the verification is passed; otherwise, the verification fails; and when the operation request is for an operation of transferring a top-level domain resource record, the method includes determining whether the requesting node has the resource record of the top-level domain; when the requesting node has the resource record of the top-level domain, the verification is passed; otherwise, the verification fails.

In one embodiment, the master node information comprises a digital signature of the master node, a block height of the master node, and identification information of the master node, correspondingly. Verifying the pre-preparation message comprises: verifying the request information, and verifying the digital signature of the master node; verifying whether the block height of the master node is consistent with the block height of the current node; and verifying whether the identification information of the master node is consistent with the identification information of the master node stored in the current node.

In one embodiment, the preparation message further comprises a digital signature of the current node, and the verifying the received preparation message comprises: checking the request information in the preparation message to obtain a verification identifier, and verifying whether it is consistent with the verification identifier of the request information in the preparation message; and verifying the node information and the digital signature of the preparation message sending node.

In one embodiment, after adding the operation result corresponding to the request information in the preparation message to the new block in the local blockchain, the method further comprises: sending, by each node, a reply message of successful execution to the requesting node; and when the requesting node does not receive the reply message within a preset time, sending a master node change request.

In one embodiment, the method further comprises: each node regularly broadcasting the height of the blockchain for local storage; when it is detected that the height of the blockchain of other nodes is higher than that of the current node, broadcasting to other nodes to request missing blocks; and after receiving and successfully verifying the missing blocks, chaining the missing blocks into local blocks for updating.

According to a second aspect, one of the embodiments of the present disclosure provides a system for management and resolution of a blockchain-based top-level domain, comprising: a master node, suitable for receiving request information for operations on top-level domain resource record sent by a requesting node, and encapsulating master node information and authenticated request information into a pre-preparation message for broadcasting; a pre-verifier, suitable for verifying the received pre-preparation message, and after successful verification, generating a preparation message for broadcast, the preparation message comprising request information, a request information verification identifier, and current node information; and a verification updater, suitable for verifying the received preparation message, when the number of authenticated preparation message sending nodes reaches a consensus threshold, adding an operation result corresponding to the request information in the preparation message to a new block in a local blockchain.

According to a third aspect, one of the embodiments of the present disclosure provides an electronic device, comprising: a memory, a processor, and a computer program stored in the memory and executable by the processor, wherein the processor executes the program to implement the steps of the method for management and resolution of a blockchain-based top-level domain according to the first aspect of the present disclosure.

According to a fourth aspect, one of the embodiments of the present disclosure provides a non-transitory computer readable storage medium in which a computer program is stored, wherein the computer program is executed by the processor to implement the steps of the method for management and resolution of the blockchain-based top-level domain according to the first aspect of the present disclosure.

For the method and system for management and resolution of a blockchain-based top-level domain provided by the embodiments of the present disclosure, by means of the first verification of the master node, the verification of the pre-preparation message, and the re-verification of the preparation message, the verification operation of each node on the top-level domain resource record is completed independently. No node will affect the verification of other nodes; and it is impossible to imitate the verification of a node because of the non-forgeability of digital signatures in the blockchain. Therefore, the identity authenticity and operational independence of the nodes involved in verification can be ensured. After successfully verified, the operation result corresponding to the request information in the preparation message is added to the new block in the local blockchain. Since the blocks in the blockchain are connected in series in order of time for storage, all blocks record the header hash and timestamp of the previous block in their headers, it is impossible to delete a block from the blockchain without affecting all subsequent blocks, namely, it is impossible to delete the operations on the top-level domain resource record stored in the block. Whether a new block is generated is determined based on a consensus threshold, and due to the tamper-proof property of the blockchain, the top-level domain resource record cannot be modified or deleted by malicious operations without the consensus verification of the nodes, thereby ensuring the security of operations on top-level domain resource record stored in the block, resisting top-level domain hijacking attacks, and providing consistent processing and storing of operations on top-level domain resource record by multiple nodes.

BRIEF DESCRIPTION OF THE DRAWINGS

In order to illustrate the embodiments of the present disclosure, drawings illustrating the embodiments are briefly introduced as follows. Of course, the drawings in the following description are only some of the embodiments of the present disclosure. For those of ordinary skill in the art, other modifications can be obtained based on these drawings without undue experimentation.

DETAILED DESCRIPTION

Figure 1:
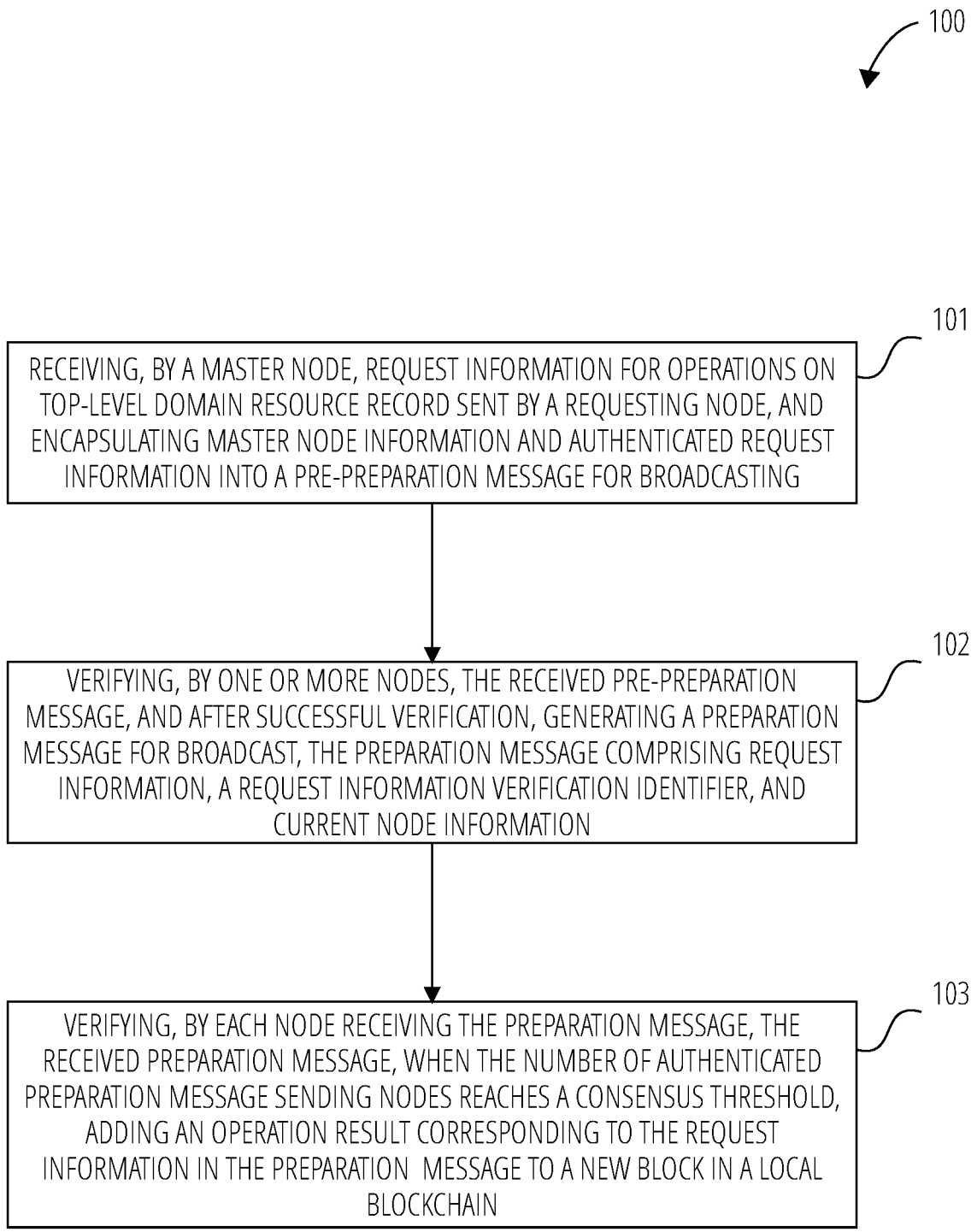
FIG. 1 is a flowchart of a method for management and resolution of a blockchain-based top-level domain according to an embodiment of the present disclosure.

In order to specify the objectives, technical solutions and advantages of the embodiments of the present disclosure, the technical solutions in the embodiments of the present disclosure will be described clearly and completely in conjunction with the accompanying drawings in the embodiments of the present disclosure. Obviously, the embodiments described below are part of the embodiments of the present disclosure, rather than all of the embodiments. Based on the embodiments in the present disclosure, all other embodiments obtained by those of ordinary skill in the art without creative effort shall fall within the protection scope of the present disclosure.

In blockchain technology, a chain structure is employed to store the processed data, and the blocks are concatenated together in order of time to form a blockchain storage structure in which all blocks record a header hash as well as a timestamp of the previous block in their headers. When the data of a block needs to be modified, it is necessary to regenerate all data in headers of the blocks behind the current block. Each of the participating nodes keeps a complete and independent copy of the blockchain data.

Blockchain technology has the following characteristics:
Decentralization and equality; blockchain technology does not rely on additional third-party management agencies or hardware facilities, and there is no centralized node, instead, each node has an equal status and jointly maintains data operations.

Transparency; operational data written to the blockchain is subject to verification by participating nodes, and each node has a complete copy of the blockchain.

Tamper-proof property; the data operations stored in the blockchain are all digitally signed by the requesting node, and verified by the consensus and digital signature of other nodes, the block contains the digital signatures of all verification nodes, and the hash of each block is contained in the next block, thus the data operations in the block cannot be tampered with by a single node.

Traceability; the block data cannot be tampered with and contains the verification information of requesting the operation node and other nodes, each data operation is recorded in the block, and the blocks are concatenated together in order of time, so that each data operation process can be traced.

The existing centralized management and resolution of TLDs has a security risk of domain name hijacking attacks on TLDs, once a top-level domain is deleted or modified from the root zone data, the domain name resolution requester will not be able to obtain a correct resolution of the top-level domain.

In the present disclosure, the characteristics of blockchain are fully utilized and applied to management and resolution of a top-level domain, and a method for management and resolution of a blockchain-based top-level domain is provided to solve the problems of top-level domain hijacking attacks and top-level domain resource records being maliciously modified by root server managers in the existing management and resolution of a domain name. When a node receives a request to resolve a top-level domain, it queries and verifies the top-level domain resource records stored in the local blockchain, and obtains the top-level domain server address corresponding to the top-level domain. After being confirmed by digital signature verification that the top-level domain resource record has not been tampered with, the obtained top-level domain server address is returned to the requester. Based on the openness of the network and the selectivity of the top-level domains, the top-level domain resolution requester can request resolution either from a node representing the top-level domain registry, or from an existing root name server.

FIG. 1 is a flowchart of a method 100 for management and resolution of a blockchain-based top-level domain provided by an embodiment of the present disclosure. As shown in FIG. 1, an embodiment of the present disclosure provides a method 100 for management and resolution of a blockchain-based top-level domain, comprising operations 101, 102, and 103.

Operation 101 comprises receiving, by a master node, request information for operations on top-level domain resource record sent by a requesting node, and encapsulating master node information and authenticated request information into a pre-preparation message for broadcast.

Before performing operation 101, each top-level domain registry serves as a node, and all nodes form a top-level domain resource record management network based on blockchain technology. No trust relationship is required between the nodes, and a decentralized network that jointly manages top-level domain resource records is formed based on blockchain; each node is of equal status. There is no centralized node; and each node stores all information about operations on top-level domain resource records in the local blockchain.

The master node is selected from the nodes representing the top-level domain registry, and is selected from all nodes representing the top-level domain registry according to preset rules through a consensus mechanism. For example, the nodes act as master nodes in order of time of joining the network. A change of the master node can be triggered by a preset time of the system or by a master node change request that has passed the consensus verification. A requesting node is a node of the top-level domain registry that initiates the change operation of the top-level domain.

In operation 101, the blockchain is jointly maintained by each participating node. When any node is to perform operations on the top-level domain resource records, it will send an operation request to the master node, and the master node will broadcast the operation request to other nodes in the blockchain after verification. The master node verifies the request information of the requesting nodes, and the legality can be verified based on digital signatures. If the verification fails, the request information is illegal, and then the process ends. If the verification is passed, the request information needs to be sent to the other nodes (e.g., all the other nodes) of the blockchain network for verification. In an embodiment of the present disclosure, the master node encapsulates the verified operation request into a pre-preparation message and broadcasts it to normal nodes (e.g., all normal nodes). The normal nodes are nodes other than the master node and the requesting node. The pre-preparation message includes: request information and master node information. The request information may include: operation request, time stamp, requesting node information, and digital signature of the request node. The master node information includes: block height of the blockchain stored in the master node, master node identification information, and digital signature of the master node. The master node, the requesting node and the normal nodes are implemented with computing devices, servers and similar devices.

Operation 102 comprises verifying, by each normal node, the received pre-preparation message, and after successful verification, generating a preparation message for broadcast, the preparation message comprising request information, a request information verification identifier, and current node information.

Considering the reliability of the master node, upon receipt of the pre-preparation message, each normal node verifies both the request message and the master node message. When either of the request message and the master node message fails in the verification, no response to the requesting node is made, and the process ends; if the verification is passed, the request information is packaged into a preparation message and sent to other nodes in the blockchain network to inform other nodes of the verification result of the current node. The "current node" in the present embodiment refers to the node that performs a corresponding action. The request information verification identifier in the preparation message is the verification result of the node that is currently sending the preparation information. When hash verification is adopted, the verification identifier is a verified hash value, and the current node information is used to inform other nodes to verify the identity of the executor.

Operation 103 comprises verifying, each node receiving the preparation message, the received preparation message. If the number of authenticated preparation message sending nodes reaches a consensus threshold, an operation result corresponding to the request information in the preparation message is added to a new block in a local blockchain.

Each node will receive preparation messages sent by other normal nodes (e.g., all other normal nodes). The verification of the preparation message is a further verification of the reliability of the normal node performing verification in operation 102, including a verification for consistency between the request information in the preparation message and the verification identifier of the request information in the preparation message, so as to achieve the reliability verification of the preparation message sending node.

Whether a request operation of the top-level domain resource record passes verification is not determined by a single node. Rather, request operation of the top-level domain resource record passes verification only if the number of nodes that have passed the verification reaches a consensus threshold. The consensus threshold in the present embodiment can be selected as the generic value of *Byzantine*-Fault-Tolerant universal value that is 2f+1; assuming that the number of malicious nodes is f, then the number of normal nodes is at least 2f+1, and the total number of nodes is at least 3f+1.

When the preparation message is verified and the number of authenticated sending nodes reaches the consensus threshold, such verification and reaching of the consensus threshold indicates that the nodes sending the preparation message are reliable nodes, and that the request information in the preparation message is not an illegal request and has not been tampered. Therefore, the nodes that receive these messages will add the operation results corresponding to the request information in the preparation information to the new block of the local blockchain. Finally, each node stores information about the requesting node's operation on top-level domain resource records in the local blockchain, and then the request information response of the requesting node is completed. According to the different categories of operation requests in the request information, the requesting node owns the top-level domain resource record when the newly added operation is successfully executed; the requesting node no longer owns the top-level domain resource record when the deleting operation is successfully executed; the requesting node no longer owns the top-level domain resource record when the transferring operation is successfully executed, and the transferred node owns the top-level domain resource record.

Further, each node verifies the received preparation message. When the number of authenticated preparation message sending nodes reaches a consensus threshold, the method 100 may continue to wait and end until the set time is exceeded.

Further, when any node receives a request for resolution of top-level domain, the receiving node queries the top-level domain resource records stored in the local block to obtain the top-level domain server address corresponding to the top-level domain. The receiving node sends the top-level domain server address corresponding to the top-level domain to a requesting terminal.

Regarding the resolution process, the method 100 of the embodiments of present disclosure is compatible with the existing domain name resolution protocol, and the process of requesting the resolution of the top-level domain from the node in the top-level domain resource record management network by a requester can be the same as the resolution process from the existing root servers, and can completely replace the existing root servers to achieve resolution of the top-level domain.

In the embodiments of the present disclosure, by means of the first verification of the master node, the verification of the pre-preparation message, and the re-verification of the preparation message, the verification operation of each node on the top-level domain resource record is completed independently. No node may affect the verification of other nodes, and it the verification of a node may not be imitated because of the non-forgeability of digital signatures in the blockchain. Therefore, the identity authenticity and operational independence of the nodes involved in verification can be ensured. After successful verification, the operation result corresponding to the request information in the preparation message is added to the new block in the local blockchain. Since the blocks in the blockchain are connected in series in order of time for storage, the blocks (e.g., all the blocks) record the header hash and timestamp of the previous block in their headers. Accordingly, a block from the blockchain may not be deleted without affecting subsequent blocks (e.g., all subsequent blocks), i.e., operations on the top-level domain resource record stored in the block may not be deleted. Whether a new block is generated is determined based on a consensus threshold. Due to the tamper-proof property of the blockchain, the top-level domain resource record may not be modified or deleted by malicious operations without the consensus verification of the nodes, thereby ensuring the security of operations on top-level domain resource record stored in the block, resisting top-level domain hijacking attacks, and providing consistent processing and storing of operations on top-level domain resource record by multiple nodes.

On the basis of the content of the foregoing embodiments, as an optional embodiment, when the number of authenticated preparation message sending nodes reaches the consensus threshold, the method 100 further comprises: adding received information of the preparation message sending nodes and digital signatures thereof to the new block in the local blockchain.

In order to trace the consensus results, in addition to adding the request information to the new block, the node information and the digital signature of the preparation message sending node will also be added to the new block. Since the block contains the digital signature for the operation on the top-level domain resource record, the block may prevent the top-level domain resource record from being maliciously tampered with and forged. The block may also avoid the occurrence of top-level domain hijacking attacks. In addition, according to the node information of the preparation message sending nodes, when the top-level domain resource record is maliciously modified by the node that owns the top-level domain resource record, the malicious behavior may be traced to the source.

On the basis of the content of the foregoing embodiments, as an optional embodiment, the master node is selected from the nodes (e.g., all the nodes) representing the top-level domain registry according to preset rules through a consensus mechanism. For example, the nodes act as master nodes in order of time of joining the network.

On the basis of the content of the foregoing embodiments, as an optional embodiment, the request information comprises an operation request and a digital signature of the requesting node. Correspondingly, after the master node receives the request information for operations on top-level domain resource record sent by the requesting node, the request information further comprises verifying the request information, including: verifying the digital signature of the requesting node. When the digital signature of the requesting node is incorrect, the verification fails; when the digital signature of the requesting node is correct, the following judgments are made: when the operation request is for an operation of adding a top-level domain resource record, determining whether the newly added top-level domain is the same as a stored top-level domain; when the newly added top-level domain is the same as a stored top-level domain, the verification fails, otherwise, the verification is passed; when the operation request is for an operation of modifying or deleting a top-level domain resource record, determining whether the requesting node has the resource record of the top-level domain; when the requesting node has the resource record of the top-level domain, the verification is passed; otherwise, the verification fails; and when the operation request is for an operation of transferring a top-level domain resource record, determining whether the requesting node has the resource record of the top-level domain; when the requesting node has the resource record of the top-level domain, the verification is passed; otherwise, the verification fails.

The node representing the top-level domain registry only performs operations on the top-level domain resource records owned by itself, but not on the top-level domain resource records owned by other nodes. Through the verification link, the validity of both the identity of the node operating the top-level domain resource record and the ownership are ensured. When performing an operation of adding a top-level domain resource record, it is verified whether the top-level domain resource record already exists and is owned by other nodes. When the top-level domain resource record already exists, the verification fails, thereby ensuring the uniqueness of the top-level domain resource record, and ensuring that there will be no ambiguity in subsequent resolutions of top-level domain. When modifying or deleting a top-level domain resource record, it is verified whether the requesting node owns the top-level domain resource record. When the requesting node does not own the top-level domain resource record, the verification fails. When performing an operation of transferring a top-level domain resource record, it is verified whether the requesting node has ownership of the top-level domain resource. If the requesting node does not have ownership of the top-level domain resource, the verification fails.

On the basis of the content of the foregoing embodiments, as an optional embodiment, the master node information comprises a digital signature of the master node, a block height of the master node, and identification information of the master node. Correspondingly, verifying the pre-preparation message comprises: verifying the request information, and verifying the digital signature of the master node; verifying whether the block height of the master node is consistent with the block height of the current node; and verifying whether the identification information of the master node is consistent with the identification information of the master node stored in the current node.

The verifying of the request information in the pre-preparation message may be referred to the foregoing verification method 100 of the request information by the master node. In case of the master node being not trusted, each node stores the identification information of the master node. The identification information of the master node is used to determine the uniqueness of the master node, such as the view number of the master node, and the block height refers to the sequence number of blocks in the blockchain. Meanwhile, the digital signature of the master node is verified such that the reliability of both the request information and the master node can be ensured by means of further verification.

On the basis of the content of the foregoing embodiments, as an optional embodiment, the verifying the received preparation message comprises: checking the request information in the preparation message to obtain a verification identifier, and verifying whether verification identifier is consistent with the verification identifier of the request information in the preparation message; and verifying the node information and the digital signature of the preparation message sending node.

In the present embodiment, the preparation message includes: request information, request information verification identifier, current node information, and digital signature of the current node. The digital signature of the node in the preparation message is configured to indicate that the sending node agrees to the operation on the top-level domain by the requesting node. Taking checking through a hash algorithm as an example, after each node receives the preparation information, the node performs a hash operation on the request information in the preparation message to obtain a hash value, and then checks a consistency between the obtained hash value and the hash value of the preparation message. When the checking is passed, the consistency between the obtained hash value and the hash value of the preparation message indicates that the request information in the preparation message is credible. The node information is verified to determine the reliability of the node; the digital signature in the preparation message is verified to determine that the node for sending preparation messages agrees to the reliability of the operation on the top-level domain by the requesting node.

On the basis of the content of the foregoing embodiments, as an optional embodiment, after adding the operation result corresponding to the request information in the preparation message to the new block in the local blockchain, the method 100 further comprises: sending, by each node, a reply message of successful execution to the requesting node; and when the requesting node does not receive the reply message within a preset time, sending a master node change request.

Each node sends a reply message of successful execution to the requesting node, wherein the reply message may include preparation messages received by the node (e.g., all preparation messages received by the node). When the requesting node finds that it cannot receive the reply message of successful execution corresponding to the operation request within a specified time, the requesting node will consider that there is something wrong with the current master node and request a master node change. Upon a successful consensus verification, the master node is changed to ensure that when the master node is abnormal, a new master node can be recovered in time to ensure the availability of the system.

On the basis of the content of the foregoing embodiments, as an optional embodiment, the method 100 further comprises: regularly broadcasting, each node, the height of the blockchain for local storage. When it is detected that the height of the blockchain of other nodes is higher than that of the current node, requests for missing blocks are broadcasted to other nodes; and after receiving the missing blocks and successfully verifying the missing blocks, the missing blocks are chained into local blocks for updating.

When a node representing a top-level domain registry newly joins the network, or the consensus process of an operation request for a top-level domain resource record is not completed due to network failures or other reasons, incomplete operations on the stored top-level domain resource records will result. Thus, each node regularly broadcasts the height of the blockchain for local storage. When it is found that the height of the blockchain of other nodes is higher than that of the current node, i.e., the information of the operation on the top-level domain resource record stored in the current node is incomplete, the node broadcasts to other nodes to request missing blocks containing operation on the top-level domain resource record, and after successful verification, the node chains the missing blocks into the local blocks and updates the stored operation on the top-level domain resource record; wherein, the verification process may adopt a consensus mechanism. For the embodiment of the present disclosure, when it is detected that the height of the blockchain of other nodes is higher than that of the current node, requests for the missing blocks are broadcasted to the other nodes so as to ensure the integrity of each block.

Figure 2:
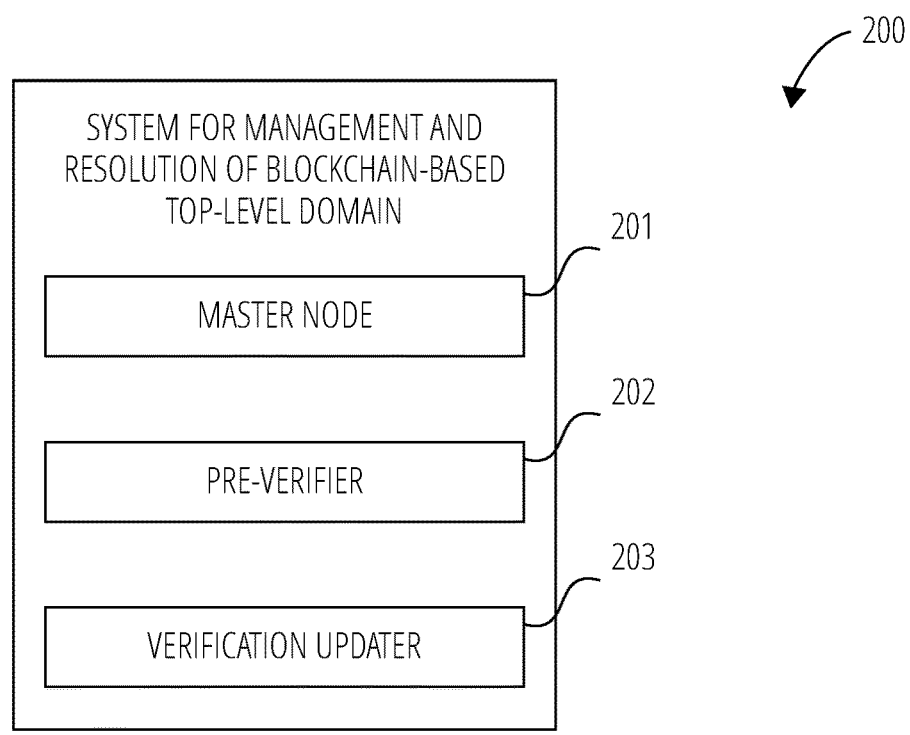
FIG. 2 is a structural diagram of a system for management and resolution of a blockchain-based top-level domain according to an embodiment of the present disclosure.

FIG. 2 is a structural diagram of a system 200 for management and resolution of a blockchain-based top-level domain provided by an embodiment of the present disclosure. As shown in FIG. 2, the system 200 for blockchain-based top-level domain management and resolution comprises: a master node 201, a pre-verifier 202, and a verification updater 203. The master node 201 is suitable for receiving request information for operations on top-level domain resource record sent by a requesting node, and encapsulating master node information and authenticated request information into a pre-preparation message for broadcasting. The pre-verifier 202 is suitable for verifying the received pre-preparation message, and after successful verification, generating a preparation message for broadcast, the preparation message comprising request information, a request information verification identifier, and current node information. The verification updater 203 is suitable for verifying the received preparation message. When the number of authenticated preparation message sending nodes reaches a consensus threshold, an operation result corresponding to the request information in the preparation message is added to a new block in a local blockchain.

The system 200 of the embodiments of the present disclosure is provided to implement the foregoing method embodiments (e.g., method 100 of FIG. 1). For the specific process and details, please refer to the foregoing method embodiments, which will not be repeated here.

For the system 200 for management and resolution of the blockchain-based top-level domain provided by the embodiments of the present disclosure, by means of the first verification of the master node the verification of the pre-preparation message, and the re-verification of the preparation message, the verification operation of each node on the top-level domain resource record is completed independently. No node will affect the verification of other nodes. Verification of a node may not be imitated because of the non-forgeability of digital signatures in the blockchain. Therefore, the identity authenticity and operational independence of the nodes involved in verification can be ensured. After successfully verified, the operation result corresponding to the request information in the preparation message is added to the new block in the local blockchain. Since the blocks in the blockchain are connected in series in order of time for storage, blocks (e.g., all blocks) record the header hash and timestamp of the previous block in their headers. A block may not be deleted from the blockchain without affecting subsequent blocks (e.g., all subsequent blocks), i.e., operations on the top-level domain resource record stored in the block may not be deleted. Whether a new block is generated is determined based on a consensus threshold, and due to the tamper-proof property of the blockchain, the top-level domain resource record cannot be modified or deleted by malicious operations without the consensus verification of the nodes, thereby ensuring the security of operations on top-level domain resource record stored in the block, resisting top-level domain hijacking attacks, and providing consistent processing and storing of operations on top-level domain resource record by multiple nodes.

Figure 3:
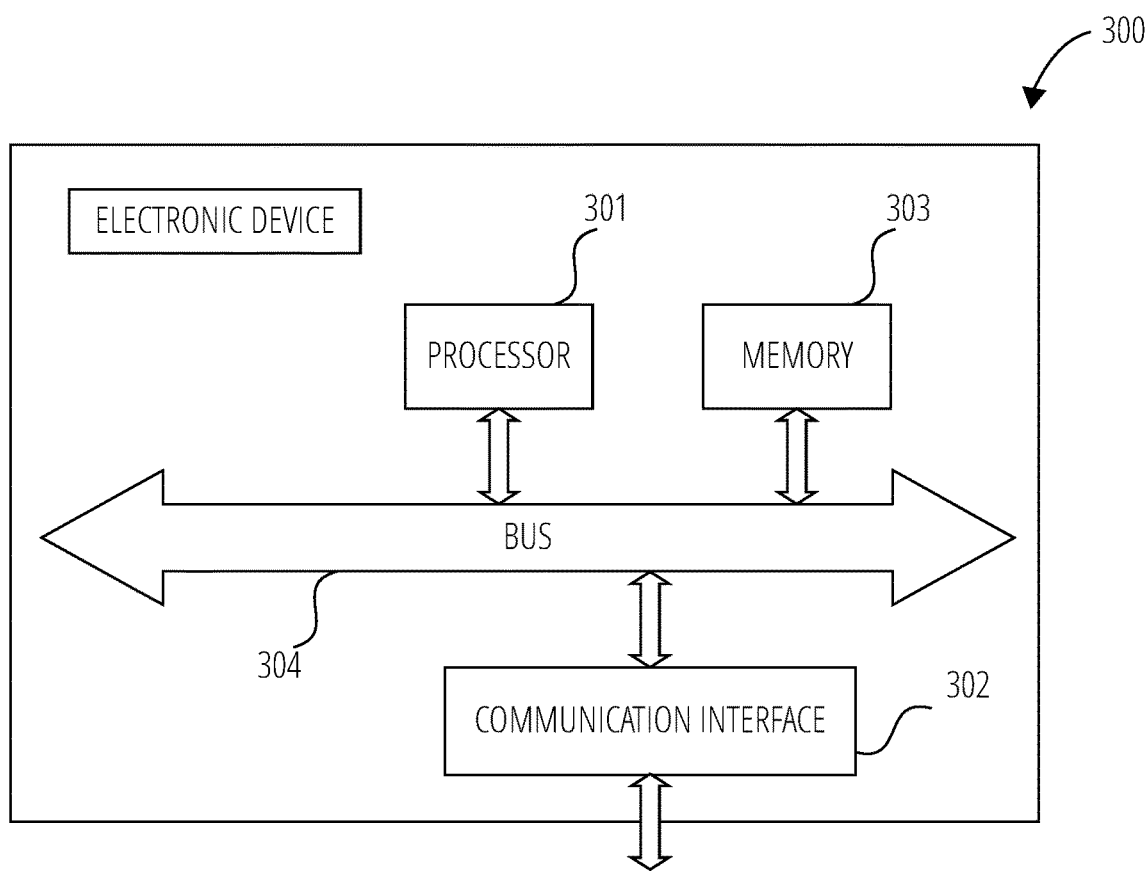
FIG. 3 is a schematic diagram of the physical structure of an electronic device according to an embodiment of the present disclosure.

FIG. 3 is a schematic diagram of the physical structure of an electronic device 300 provided by an embodiment of the present disclosure. As shown in FIG. 3, the electronic device 300 may include: a processor 301, a communication interface 302, a memory 303, and a bus 304. The processor 301, the communication interface 302, and the memory 303 communicate with each other through the bus 304. The communication interface 302 may be configured to perform information transmission of the electronic device 300. The processor 301 may call the logic instructions in the memory 303 to execute the following methods: receiving, by a master node, request information for operations on top-level domain resource record sent by a requesting node, and encapsulating master node information and authenticated request information into a pre-preparation message for broadcasting; verifying, by each normal node, the received pre-preparation message, and after successful verification, generating a preparation message for broadcast, the preparation message comprising request information, a request information verification identifier, and current node information; and verifying, each node, the received preparation message, when the number of authenticated preparation message sending nodes reaches a consensus threshold, adding an operation result corresponding to the request information in the preparation message to a new block in a local blockchain.

In addition, the foregoing logical instructions in the memory 303 may be implemented in the form of software functional units and may be stored in a computer readable storage medium when sold or used as an independent product. Therefore, the technical solutions of the present disclosure may be embodied in the form of software products, and the computer software products are stored in computer readable storage media and include a number of instructions to make a computer device (which can be a personal computer, a server, or a network equipment, etc.) execute all or part of the operations of the methods according to the various embodiments of the present disclosure. The aforementioned storage media include: U disk, mobile hard disk, ROM (Read-Only Memory), RAM (Random Access Memory), magnetic disc, compact disc and other media that can store program code.

According to another aspect, an embodiment of the present disclosure provides a non-transitory computer readable storage medium. A computer program is stored therein, wherein the computer program is executed by the processor to implement the steps of the method for management and resolution of the blockchain-based top-level domain provided by the embodiments above, for example, comprising: receiving, by a master node, request information for operations on top-level domain resource record sent by a requesting node, and encapsulating master node information and authenticated request information into a pre-preparation message for broadcasting; verifying, by each normal node, the received pre-preparation message, and after successful verification, generating a preparation message for broadcast, the preparation message comprising request information, a request information verification identifier, and current node information; and verifying, by each node, the received preparation message, when the number of authenticated preparation message sending nodes reaches a consensus threshold, adding an operation result corresponding to the request information in the preparation message to a new block in a local blockchain.

The system embodiments disclosed above are only schematic, wherein the units described as separate components may or may not be physically separated, and the components displayed as units may or may not be physical units, i.e., they may be located in one place or, may be distributed to multiple network units. Part or all of the modules may be selected according to actual needs to achieve the purpose of the solutions of the embodiments. The system embodiments disclosed above can be understood and implemented by a person of ordinary skill in the art without undue experimentation.

Through the description of the above embodiments, it can be clearly understood by those skilled in the art that each embodiment can be implemented by means of software plus a necessary general hardware platform, and of course, it can also be implemented by hardware. Based on this understanding, the technical solutions above can be embodied in the form of software products, and the computer software products can be stored in computer readable storage media, such as ROM/RAM, magnetic disc, compact disc. The software also includes a plurality of instructions to enable a computer device (may be a personal computer, server, or network equipment, etc.) to execute the methods of various embodiments or some parts of the embodiments.

It should be noted that the embodiments are only for illustrating the technical solutions of the present disclosure, rather than limiting them; although the present disclosure has been described in detail with reference to the foregoing embodiments, those skilled in the art should understand that the technical solutions documented in the preceding embodiments may still be modified, or parts of the technical features thereof can be equivalently substituted; and such modifications or substitutions do not deviate from scope of the technical solutions of the embodiments of the present disclosure.

What is claimed is:

1. A method for management and resolution of a blockchain-based top-level domain, the method comprising:
    receiving, by a master node, request information for operations on a top-level domain resource record sent by a requesting node;
    encapsulating master node information and authenticated request information into a pre-preparation message for broadcasting;
    verifying, by one or more normal node, a received pre-preparation message;
    generating, after successful verification, a preparation message for broadcast, the preparation message comprising request information, a request information verification identifier, and current node information;
    verifying, by each node receiving the preparation message, the received preparation message;
    adding, when a number of authenticated preparation message sending nodes reaches a consensus threshold, an operation result corresponding to the request information in the preparation message to a new block in a local blockchain; and
    sending, by each node, a reply message of successful execution to the requesting node after adding the operation result corresponding to the request information in the preparation message to the new block in the local blockchain.

2. The method for management and resolution of the blockchain-based top-level domain of claim 1, wherein, when the number of authenticated preparation message sending nodes reaches the consensus threshold, the method further comprises:
    adding received information of preparation message sending nodes and digital signatures thereof to the new block in the local blockchain.

3. The method for management and resolution of the blockchain-based top-level domain of claim 1, wherein:
    the request information comprises an operation request and a digital signature of the requesting node;
    the method further comprises verifying, after the master node receives the request information for operations on top-level domain resource record sent by the requesting node, the request information, which includes:
        failing the verification of the request information responsive to an incorrect digital signature of the requesting node; and
        passing the verification of the request information responsive to a correct digital signature of the requesting node;
    determining, when the operation request is for an operation of newly adding a top-level domain resource record, whether a newly added top-level domain is the same as a stored top-level domain;
    failing the verification responsive to a determination that the newly added top-level domain is the same as the stored top-level domain;
    passing the verification responsive to a determination that the newly added top-level domain is different from the stored top-level domain;
    determining, when the operation request is for an operation of modifying or deleting a top-level domain resource record, whether the requesting node has the resource record of the top-level domain;
    passing the verification responsive to a determination that the requesting node has the resource record of the top-level domain;
    failing the verification responsive to a determination that the requested node does not have the resource record of the top-level domain;
    determining, when the operation request is for an operation of transferring a top-level domain resource record, whether the requesting node has the resource record of the top-level domain;
    passing the verification responsive to a determination that the requesting node has the resource record of the top-level domain; and
    failing the verification responsive to a determination that the requesting node does not have the resource record of the top-level domain.

4. The method for management and resolution of the blockchain-based top-level domain of claim 1, wherein:
    the master node information comprises a digital signature of the master node, a block height of the master node, and identification information of the master node; and
    verifying the pre-preparation message comprises:
        verifying the request information, and verifying the digital signature of the master node;
        verifying whether the block height of the master node is consistent with the block height of a current node; and
        verifying whether the identification information of the master node is consistent with the identification information of the master node stored in the current node.

5. The method for management and resolution of the blockchain-based top-level domain of claim 1, wherein:
the preparation message further comprises a digital signature of a current node; and
verifying the received preparation message comprises:
checking the request information in the preparation message to obtain a verification identifier;
verifying whether the obtained verification identifier is consistent with the verification identifier of the request information in the preparation message; and
verifying the node information and the digital signature of the preparation message sending node.

6. The method for management and resolution of the blockchain-based top-level domain of claim 1, further comprising:
sending a master node change request responsive to the requesting node not receiving the reply message within a preset time.

7. The method for management and resolution of the blockchain-based top-level domain of claim 1, further comprising:
broadcasting regularly, by each node, a height of a blockchain for local storage;
broadcasting to other nodes to request missing blocks responsive to a height of a blockchain of other nodes being higher than that of the current node; and
chaining missing blocks into local blocks for updating responsive to receiving the missing blocks and successfully verifying the missing blocks.

8. The method for management and resolution of the blockchain-based top-level domain of claim 1, wherein at least a portion of the method is executed by a processor of an electronic device, the electronic device comprising a memory and a computer program stored in the memory, the computer program executable by the processor, wherein the processor executes the computer program to perform operations of the method.

9. A system for management and resolution of a blockchain-based top-level domain, comprising:
a master node including a processor configured to:
receive request information for operations on top-level domain resource record sent by a requesting node; and
encapsulate master node information and authenticated request information into a pre-preparation message for broadcasting;
a pre-verifier configured to:
verify a received pre-preparation message; and
generating, responsive to successful verification, a preparation message for broadcast, the preparation message comprising request information, a request information verification identifier, and current node information; and
a verification updater configured to:
verify a received preparation message;
add, responsive to a number of authenticated preparation message sending nodes reaching a consensus threshold, an operation result corresponding to the request information in the preparation message to a new block in a local blockchain; and
send, by each node, a reply message of successful execution to the requesting node after adding the operation result corresponding to the authenticated request information in the preparation message to the new block in the local blockchain.

10. A non-transitory computer readable storage medium, a computer program is stored therein, wherein the computer program is executable by a processor to:
receive, by a master node, request information for operations on a top-level domain resource record sent by a requesting node;
encapsulate master node information and authenticated request information into a pre-preparation message for broadcasting;
verify, by one or more normal node, a received pre-preparation message;
generate, after successful verification, a preparation message for broadcast, the preparation message comprising request information, a request information verification identifier, and current node information;
verify a received preparation message by each node receiving the preparation message;
add, when a number of authenticated preparation message sending nodes reaches a consensus threshold, an operation result corresponding to the request information in the preparation message to a new block in a local blockchain; and
send, by each node, a reply message of successful execution to the requesting node after adding the operation result corresponding to the request information in the preparation message to the new block in the local blockchain.

* * * * *